（12）United States Patent
Schnellbach et al.

(10) Patent No.: US 12,528,417 B2
(45) Date of Patent: Jan. 20, 2026

(54) VEHICULAR OVERHEAD CONSOLE INTEGRATED WITH INTERIOR MIRROR AND ELECTRONIC CONTENT

(71) Applicant: Magna Mirrors Holding GmbH, Sailauf (DE)

(72) Inventors: Felix Schnellbach, Freudenberg (DE); Peter Krebs, Moembris (DE)

(73) Assignee: Magna Mirrors Holding GmbH, Sailauf (DE)

( * ) Notice: Subject to any disclaimer, the term of this patent is extended or adjusted under 35 U.S.C. 154(b) by 516 days.

(21) Appl. No.: 18/176,544

(22) Filed: Mar. 1, 2023

(65) Prior Publication Data

US 2023/0286441 A1　Sep. 14, 2023

Related U.S. Application Data

(60) Provisional application No. 63/268,853, filed on Mar. 4, 2022.

(51) Int. Cl.
*B60R 7/04* (2006.01)
*B60Q 3/258* (2017.01)
*B60Q 3/80* (2017.01)
*B60R 1/12* (2006.01)

(52) U.S. Cl.
CPC ................ *B60R 7/04* (2013.01); *B60Q 3/258* (2017.02); *B60Q 3/80* (2017.02); *B60R 1/12* (2013.01); *B60R 2001/1292* (2013.01)

(58) Field of Classification Search
None
See application file for complete search history.

(56) References Cited

U.S. PATENT DOCUMENTS

| | | |
|---|---|---|
| 5,576,898 A | 11/1996 | Rubin |
| 9,405,120 B2 | 8/2016 | Graf et al. |
| 10,017,114 B2 | 7/2018 | Bongwald |
| 10,046,706 B2 | 8/2018 | Larson et al. |
| 10,065,574 B2 | 9/2018 | Tiryaki |
| 10,166,924 B2 | 1/2019 | Baur |
| 10,421,404 B2 | 9/2019 | Larson et al. |
| 10,442,360 B2 | 10/2019 | LaCross et al. |
| 11,639,134 B1 | 5/2023 | Huizen et al. |
| 11,780,372 B2 | 10/2023 | Sobecki et al. |
| 11,930,264 B2 | 3/2024 | Conger et al. |
| 2001/0013825 A1 | 8/2001 | DeLine et al. |
| 2004/0184282 A1 | 9/2004 | Nishijima et al. |
| 2005/0134073 A1 | 6/2005 | Tokutomi et al. |

(Continued)

*Primary Examiner* — Richard H Kim
(74) *Attorney, Agent, or Firm* — HONIGMAN LLP

(57) ABSTRACT

A vehicular accessory system includes an overhead console module having (i) a primary portion configured to attach at an interior portion of a vehicle, and (ii) a secondary portion that, with the primary portion attached at the interior portion of the vehicle, extends from the primary portion. The secondary portion extends along an interior surface of the vehicle and is spaced from and disposed below the interior surface of the vehicle. An interior rearview mirror assembly includes a mirror head that includes a mirror reflective element and that is adjustably mounted at the overhead console module via a mounting structure. An electronic control unit (ECU) is disposed at the overhead console module and includes electronic circuitry and associated software. The ECU is operable to control a system of the vehicle and an electronic accessory of the interior rearview mirror assembly.

30 Claims, 2 Drawing Sheets

(56) References Cited

U.S. PATENT DOCUMENTS

| | | |
|---|---|---|
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0217367 A1 | 8/2017 | Pflug et al. |
| 2017/0274906 A1 | 9/2017 | Hassan et al. |
| 2018/0222414 A1 | 8/2018 | Ihlenburg et al. |
| 2018/0231976 A1 | 8/2018 | Singh |
| 2019/0118717 A1 | 4/2019 | Blank et al. |
| 2019/0146297 A1 | 5/2019 | Lynam et al. |
| 2019/0210615 A1 | 7/2019 | Caron et al. |
| 2019/0258131 A9 | 8/2019 | Lynam et al. |
| 2020/0143560 A1 | 5/2020 | Lu et al. |
| 2020/0202151 A1 | 6/2020 | Wacquant |
| 2020/0320320 A1 | 10/2020 | Lynam |
| 2020/0377022 A1 | 12/2020 | LaCross et al. |
| 2021/0155167 A1 | 5/2021 | Lynam et al. |
| 2021/0162926 A1 | 6/2021 | Lu |
| 2021/0188092 A1 | 6/2021 | Peterson |
| 2021/0245662 A1 | 8/2021 | Blank et al. |
| 2021/0291739 A1 | 9/2021 | Kasarla et al. |
| 2021/0323473 A1 | 10/2021 | Peterson et al. |
| 2022/0111857 A1 | 4/2022 | Kulkarni |
| 2022/0242438 A1 | 8/2022 | Sobecki et al. |
| 2022/0254132 A1 | 8/2022 | Rother |
| 2023/0010223 A1 | 1/2023 | Andersson et al. |
| 2023/0078512 A1 | 3/2023 | Peterson et al. |

VEHICULAR OVERHEAD CONSOLE INTEGRATED WITH INTERIOR MIRROR AND ELECTRONIC CONTENT

CROSS REFERENCE TO RELATED APPLICATION

The present application claims the filing benefits of U.S. provisional application Ser. No. 63/268,853, filed Mar. 4, 2022, which is hereby incorporated herein by reference in its entirety.

FIELD OF THE INVENTION

The present invention relates generally to the field of interior rearview mirror assemblies and overhead consoles for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. The mirror assembly is typically mounted at an in-cabin side of the windshield (via a mirror mounting button adhesively attached at the in-cabin side of the windshield) or at a headliner (via a single pivot joint mounting base or stay).

SUMMARY OF THE INVENTION

A vehicular accessory system includes an overhead console module and an interior rearview mirror assembly that are combined into a singular unit mountable at an interior portion of a vehicle. The overhead console module includes an electronic control unit (ECU) that includes electronic circuitry and associated software and is configured or operable to control a system of the vehicle (such as an advanced driver assist system (ADAS) or imaging system or the like) and control an electronic function of the interior rearview mirror assembly (such as an automatic dimming function of the mirror reflective element). Thus, the vehicular accessory system can have a shared ECU for the overhead console module and the interior rearview mirror assembly, leading to reduced costs and improved functionality. The overhead console module may include a portion that extends along and is spaced from an upper interior surface (such as a headliner) of the vehicle and includes a light source operable to illuminate the interior surface of the vehicle for an ambient lighting function.

Thus, for example, a vehicular accessory system may include an overhead console module, the overhead console module including a primary portion and a secondary portion. The primary portion is configured to attach at an interior portion of the vehicle and the secondary portion, with the primary portion attached at the interior portion of the vehicle, extends from the primary portion along an interior surface of the vehicle and is below and is spaced from the interior surface of the vehicle. An interior rearview mirror assembly includes a mirror head and mounting structure and the mirror head is adjustably mounted at the mounting structure and the mounting structure is attached at the overhead console module. The mirror head includes a variably reflectance electro-optic mirror reflective element and at least one electronic accessory. An ECU includes electronic circuitry and associated software and is disposed at the overhead console module. The ECU is operable to control a system of the vehicle, control the at least one electronic accessory of the mirror head and control dimming of the variably reflectance electro-optic mirror reflective element.

These and other objects, advantages, purposes and features of the present invention will become apparent upon review of the following specification in conjunction with the drawings.

DESCRIPTION OF THE PREFERRED EMBODIMENTS

Figure 1:
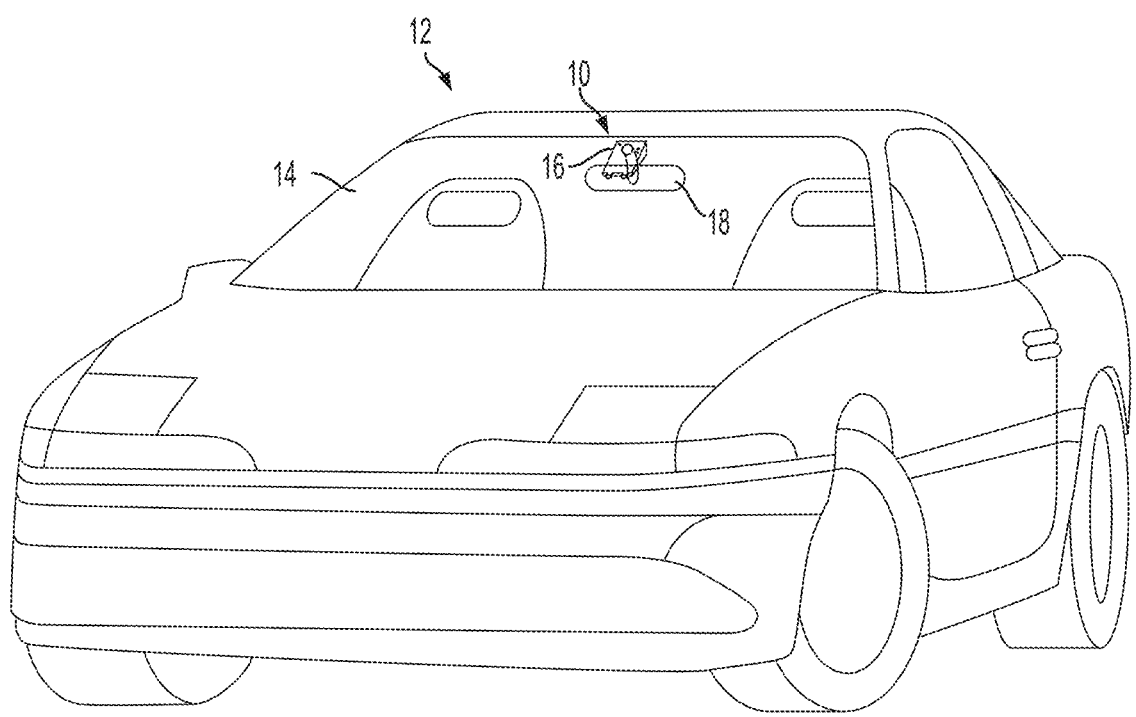
FIG. 1 Is a perspective view of a vehicle with a vehicular accessory system installed at an interior portion of the vehicle.

Overhead consoles, windshield mounted electronics consoles, interior rearview mirrors with integrated functionality, and other driver-accessible and/or vehicle occupant-accessible electronic modules or components are often installed in vehicles and provide functions that include advanced driver assist systems (ADAS), driver monitoring systems (DMS), occupant monitoring systems (OMS), reading lights, emergency call systems, audio and/or video call systems, and the like. These systems may require electronic components, such as one or more cameras (such as a forward viewing camera having a field of view through the windshield of the vehicle or a driver facing camera at the interior of the vehicle having a field of view that includes a head region of the driver of the vehicle), an electronic control unit (ECU) with electronic circuitry and associated software that includes data and/or image processors, radar, lidar, rain/light/humidity sensor, a human machine interface (HMI) for receiving user inputs, and the like. These systems and any driver-accessible controls may be located at different positions within the vehicle (such as at the overhead console, interior rearview mirror, windshield mounted module, center console, and gauge cluster). Further, display related to the different systems may be provided at separate and discrete display screens at different positions throughout the vehicle or projected onto the windshield as a heads up display (HUD). This complicates the controls and information presented to the driver, reducing the driver's ability to control and/or understand such systems and therefore reducing the potential effectiveness of such systems for the driver. Additionally, placing the systems in various positions within the vehicle or integrating the systems into different existing components within the vehicle may result in the multiple systems being hosted across multiple ECUs on multiple printed circuit boards (PCBs), thus complicating the processing and wireless and/or wired communication needs of the systems of the vehicle. Furthermore, the multiple components mount separately at the interior portion of the vehicle, such as to the headliner, the interior facing surface of the windshield, or the dashboard of the vehicle, thus complicating assembly and requiring additional mounting components, therefore increasing costs.

For example, a vehicle may traditionally be equipped with an overhead console module mounted at the headliner of the vehicle and an interior rearview mirror assembly mounted separately from the overhead console module at the interior or cabin-facing surface of the windshield. That is, in the same area of the vehicle, two separate modules are mounted (and not connected), therefore two (or more) PCBs are needed for the electronic circuitry of the respective modules. Furthermore, there may be limited areas for HMIs.

As discussed further below, the vehicular accessory system includes an overhead console module that mounts at an interior portion of the vehicle and an interior rearview mirror assembly that mounts at the overhead console module. An ECU is disposed at the overhead console module and the ECU controls a system of the vehicle and a function of the interior rearview mirror assembly. That is, the vehicular accessory system represents a fusion of the overhead console with the interior rearview mirror assembly, and with the fusion of two products, it is possible to merge the two (or more) PCBs so that the accessory system includes a common PCB for controlling accessories or aspects of the mirror assembly (such as, for example, electrochromic mirror dimming functions, cabin monitoring functions, and the like) and of the overhead console (such as, for example, in-cabin illumination, cabin monitoring functions, and the like). The vehicular accessory system may utilize characteristics of the systems described in U.S. patent application Ser. No. 17/931,988, filed Sep. 14, 2022 and published on Mar. 16, 2023 as U.S. Patent Application Pub. No. US-2023-0078512, which is hereby incorporated herein by reference in its entirety.

Referring now to the drawings and the illustrative embodiments depicted therein, a vehicular accessory system 10 is disposed at an interior portion or cabin of a vehicle 12. As shown in FIG. 1, the vehicular accessory system 10 is mounted at least partially at an interior or cabin-facing side or surface of the windshield 14 of the vehicle 12. The system 10 includes an overhead console module 16 and an interior rearview mirror assembly 18 is mounted or attached at or integrated at the overhead console module 16. The interior rearview mirror assembly 18 provides a view to a driver of the vehicle that is rearward of the vehicle. The overhead console module 16 includes an electronic control unit (ECU) disposed thereat and the ECU includes electronic circuitry and associated software configured or operable to provide one or more electronic functions of the vehicular accessory system 10. For example, the ECU may provide processing or electronic functionality for a system of the vehicle 12 and an electronic function of the interior rearview mirror assembly 18. The vehicular accessory system 10 is electrically powered by a power source of the vehicle 12, such as via connection to a wiring harness of the vehicle. Thus, the overhead console 16, with the integrated or attached interior rearview mirror 18, provides a module that is mounted at an interior portion of the vehicle to provide processing of a system of the vehicle and an enhanced interior rearview mirror.

Figure 2:
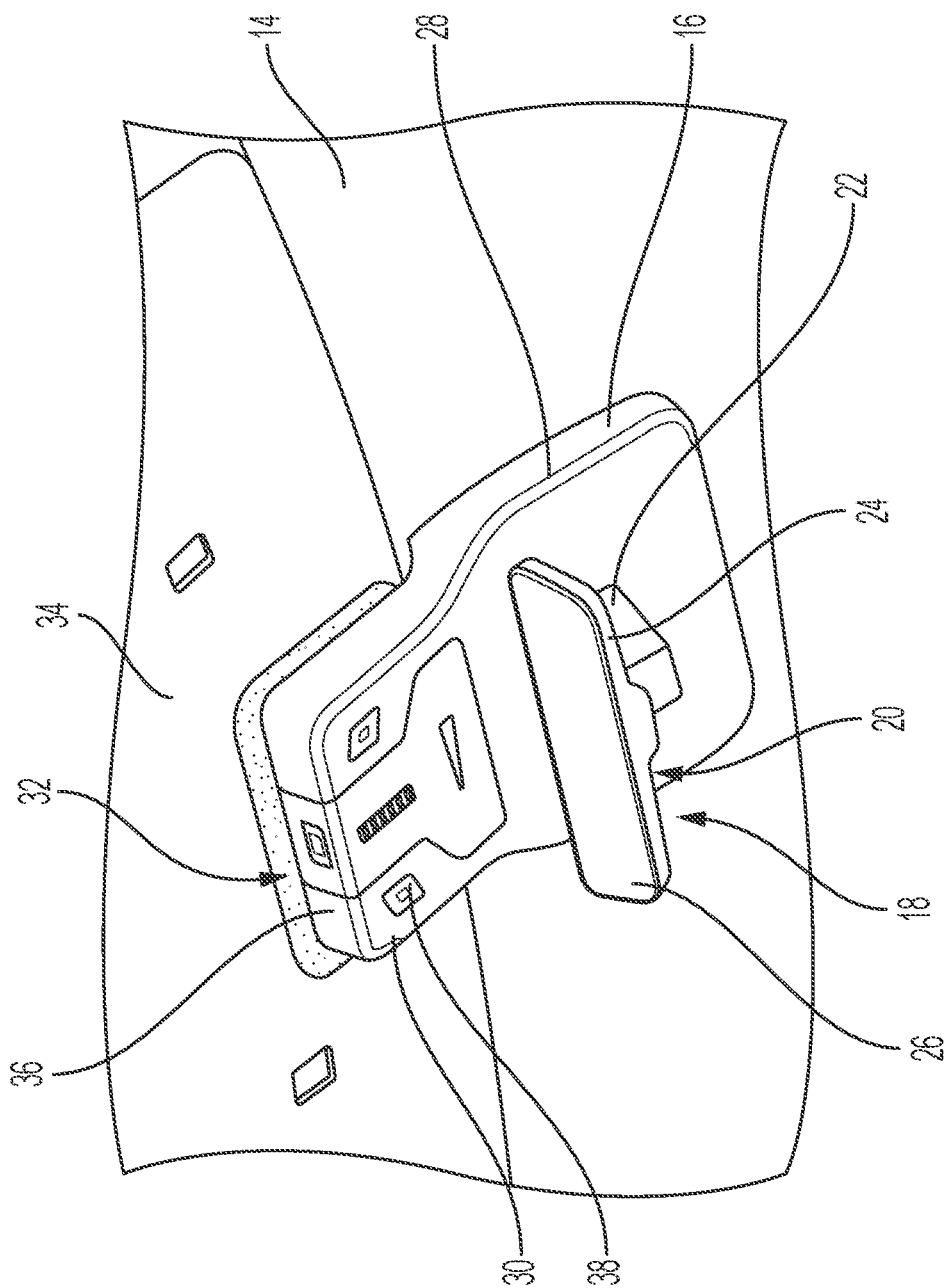
FIG. 2 is a perspective view of a vehicular accessory system mounted to an inner surface of a windshield at the interior portion of the vehicle.

As shown in FIG. 2, the interior rearview mirror assembly 18 includes a mirror head 20 adjustably mounted to the overhead console module 16 via mounting structure, such as a mounting arm 22 connecting the mirror head 20 to the overhead console module 16. The mirror head 20 includes a mirror casing 24 and a mirror reflective element 26 and the mirror head 20 is adjustable relative to the mounting arm 22 to adjust the rearward view provided to the driver by the mirror reflective element 26. The interior rearview mirror assembly 18 may comprise any suitable mirror reflective element 26 having an electronic function, such as a variable reflectance electro-optic mirror reflective element that varies its reflectance responsive to electric current applied to conductive coatings or layers of the reflective element, and the electronic circuitry necessary to control the function of the interior rearview mirror assembly 18 is disposed at the ECU of the overhead console module 16. The interior rearview mirror assembly may electrically connect to the overhead console module 16, such as to send and receive signals, via electric wiring routed through the mounting structure 22.

For example, the interior rearview mirror assembly 18 may include an electro-optic mirror reflective element that utilizes characteristics of the interior rearview mirror assemblies described in U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Optionally, the interior rearview mirror assembly 18 may include a dual-mode interior rearview mirror video mirror that switches between a traditional reflection mode and a live video display mode, such as by utilizing characteristics of the mirror assemblies and systems described in U.S. Pat. Nos. 10,442,360; 10,421,404; 10,166,924 and/or 10,046,706, and/or U.S. Publication Nos. US-2021-0245662; US-2021-0162926; US-2021-0155167; US-2020-0377022; US-2019-0258131; US-2019-0146297; US-2019-0118717 and/or US-2017-0355312, which are hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Publication No. US-2021-0245662, which is hereby incorporated herein by reference in its entirety.

Thus, the mirror reflective element 26 may be an electro-optic variable reflectance mirror reflective element and the ECU (in the console) may include mirror control circuitry operable to adjust dimming of the mirror reflective element responsive to processing of captured sensor data (such as sensor data captured by an imaging sensor or ambient light sensor disposed at the vehicle such as at the overhead console). Optionally, the mirror reflective element may include a video display screen that is operable to display video images transmitted to the interior rearview mirror assembly 18 from the ECU. Because the overhead console module 16 houses the ECU and other electronic components that enable functionality of the interior rearview mirror assembly 18, the interior rearview mirror assembly 18 does not need a separate ECU or PCB, reducing costs of the assembly and allowing for a smaller and slimmer size and profile of the interior rearview mirror.

The overhead console module 16 includes a primary portion or base portion or mounting portion 28 that is configured to mount at the interior portion of the vehicle 12 and a secondary portion or floating portion 30 that extends from the mounting portion 28 and along an interior surface of the vehicle and spaced from the interior surface of the vehicle. For example, the mounting portion may attach at the in-cabin side of the vehicle windshield or at the vehicle headliner or at a frame portion of a sunroof or panoramic roof of the vehicle, or the like. The interior rearview mirror assembly 18 may mount to the mounting portion 28 of the overhead console module 16 such that the mounting structure 22 extends from the mounting portion 28 and the overhead console module 16 houses the ECU and other electronic components that electrically connect to the interior rearview mirror assembly 18 via wiring routed through the mounting structure 22.

In the illustrated embodiment, the mounting portion 28 mounts at the in-cabin facing side or surface of the windshield 14, such as at an upper region of the windshield 14. The floating portion 30 extends from the mounting portion 28 and along and spaced from an upper interior surface (e.g., along the headliner immediately rearward of the upper region of the windshield) of the vehicle. For example, the floating portion 30 may extend along, and not be mounted to, the headliner or a sunroof or a moonroof or a panoramic glass roof or a retractable convertible top of the vehicle. Thus, the overhead console module 16 may be mountable within a vehicle where it is impossible or undesirable to mount the overhead console 16 in a traditional manner (e.g., to the headliner of the vehicle). In other words, the overhead console module 16 that mounts to the in-cabin facing surface of the windshield 14 and extends along and spaced from an upper interior surface of the vehicle allows for installation of the vehicular accessory system 10 without mounting to the roof or headliner of the vehicle. For example, the system may be installed in a convertible (where the roof is retractable) or the system may allow for a sunroof or panoramic glass roof or the like to be extended from a traditional placement further forward toward the windshield 14 without interfering with mounting position of the overhead console.

The floating portion 30 may include an indirect or ambient illumination source 32 that provides ambient lighting at the interior portion of the vehicle 12 by shining light from the floating portion 30 onto the headliner or interior surface 34 of the vehicle. For example, the floating portion 30 of the overhead console 16 may include one or more light sources 32 facing the interior surface 34 of the vehicle and spaced from the interior surface 34, whereby the light sources 32 are operable to illuminate the surface to provide indirect or ambient lighting at the interior portion of the vehicle. The ambient lighting may be adjustable and configurable by the driver of the vehicle, such as dimmable, responsive to an input by the driver of the vehicle. For example, the driver may be able to adjust the color or intensity or direction of the light directed at the interior surface of the vehicle. When adjusting the direction of the light directed at the interior surface 34, an angle of the light source 32 relative to the interior surface 34 may change to adjust a primary position of illumination relative to the overhead console 16, such as from a central region of the vehicle headliner 34 toward a peripheral region of the vehicle headliner 34. Optionally, the ambient light source 32 may be operable to illuminate an icon or logo or image at the headliner of the vehicle. The ambient light source 32 may include any suitable light source, such as one or more light-emitting diodes (LEDs), micro-LEDs, or the like.

The floating portion 30 of the overhead console module 16, because it is spaced from the interior surface 34 of the vehicle, provides additional surface area for locating HMIs. For example, the floating portion 30 may include a side surface 36 or depth of the overhead console module 16 at which one or more HMIs or user actuatable inputs or buttons 38 may be located. Such HMIs 38 may be actuatable by the driver of the vehicle to control operation of one or more systems of the vehicle, such as to control the ambient lighting or a telecommunications system or an advanced driver assist system (ADAS) of the vehicle. Optionally, one or more additional lighting sources (such as for a reading light) may be disposed at the side surface 36 of the overhead console module 16. Furthermore, one or more visual indicators, such as a display screen or illuminable icon, may be disposed at the side surface 36 to provide information or alerts to the driver of the vehicle (e.g., a seatbelt indicator, an airbag indicator, a climate control indicator, and the like).

When mounted to the in-cabin facing surface of the windshield 14, the overhead console 16 may include one or more sensors that view forward of the vehicle through the windshield 14 and that capture sensor data representative of the environment of the vehicle 12. The ECU includes electronic circuitry and associated software operable to process sensor data captured by the one or more sensors to provide or enable or transmit the processed sensor data to one or more systems of the vehicle. For example, the one or more sensors may include one or more imaging sensors or cameras and the ECU may include an image processor for processing image data captured by the imaging sensor. The ECU may process the captured image data for object detection, for a dashcam or security camera that records video images, to provide augmented reality, or for an ADAS that provides varying levels of autonomous control or semi-autonomous control of the vehicle. The ECU may transmit video images derived from the processed image data for display at a display screen at the interior of the vehicle, such as at the interior rearview mirror assembly 18.

Optionally, sensors such as a rain sensor, an ambient light sensor, a glare light sensor, radar, lidar, a driver or occupant monitoring camera (and/or near-IR illumination sources for a driver or occupant monitoring camera), a microphone and the like may be disposed at the overhead console module 16 or the interior rearview mirror assembly 18 and the ECU at the overhead console module 16 may process captured sensor data for the system of the vehicle or the electronic function of the mirror. For example, a driver monitoring camera may be disposed behind the mirror reflective element and view through the mirror reflective element for determining attentiveness of the driver and the driver monitoring camera may transmit captured image data to the ECU at the overhead console module 16 through wiring routed through the mounting structure 22. Optionally, an occupant monitoring camera may be disposed at the console and may capture image data for an occupant detection/monitoring function. By positioning the occupant monitoring camera at the overhead console 16 disposed at the windshield or forward region of the vehicle, the view of the camera may be downward and rearward from the overhead console 16 and may provide enhanced viewing of the rear seats of the vehicle. The ECU of the driver monitoring system/occupant monitoring system may be disposed at the console and may control cameras and/or near-IR illuminators at the mirror head and/or console.

The ECU at the overhead console module thus provides processing and control for the electronic accessories of the mirror head (e.g., the driver monitoring camera and/or near IR light emitters disposed behind the mirror reflective element, the video display screen of the mirror reflective element, and the like), the dimming of the variably reflectance mirror reflective element and one or more systems of the vehicle. For example, the ECU may process image data captured by the driver monitoring camera and/or the forward viewing camera at the overhead console module and provide an output based on processing of the image data to the ADAS that is providing at least partial control of the vehicle (e.g., for an adaptive cruise control system or a lane keep assist system or a pedestrian detection system or a collision avoidance system or a headlamp control system or the like) and/or the ECU may provide an output based on the processed image data to a camera monitoring system (CMS) of the vehicle. Thus, processing of image data to determine driver attentiveness and processing of image data to determine obstacles in the path of travel of the vehicle occurs at the ECU disposed at the overhead console, which may result in faster or more accurate determinations (e.g., a determination that the driver should take over control of the vehicle to avoid an obstacle, or a determination that the attentiveness level of the driver is too low for a current traffic level or driving condition). Optionally, the ECU at the overhead console module may provide control and/or processing for the vision system of the vehicle (such as to provide rear backup video images and/or surround view video images for display to the driver of the vehicle, generated from image data captured by one or more cameras disposed at the vehicle, as discussed further below). Further, the ECU may be operable to control an ambient lighting system of the vehicle, where the ECU controls the light source disposed at the overhead console module and/or one or more other light sources disposed at the vehicle cabin to illuminate the vehicle cabin, and to control such features as brightness, color, and position of the illumination.

Thus, the vehicular accessory system 10 includes the overhead console module 16 with primary portion 28 mounted at or attached to the interior portion of the vehicle 12 and secondary portion 30 extending form the primary portion along an interior surface of the vehicle and below and spaced from the interior surface. An interior rearview mirror assembly includes a mirror head and mounting structure and the mirror head is adjustably mounted at the mounting structure that is attached at the overhead console module. The mirror head includes a variably reflectance electro-optic mirror reflective element and at least one electronic accessory, such as the video display screen and/or the driver monitoring camera and near IR light emitter. An ECU is disposed at the overhead console module and controls a system of the vehicle, controls the at least one electronic accessory of the mirror head and controls dimming of the variably reflectance electro-optic mirror reflective element.

That is, the vehicular accessory system includes a fusion of the overhead console module with the interior rearview mirror assembly. The module has a "floating part" where it is possible to integrate additional HMIs (or lighting features) on the side areas of the module. The module can be fixed on the roof or on the windshield, thereby the integration of the sensors (rain sensor, camera, and the like) is also possible and electronic components (power supply, processor, and the like) can be integrated in a "Main PCB." With the fusion of the two components, it is possible to merge the two PCBs and sensors may be connected and functionally integrated, which leads to a cost reduction. With the improved styling, it is possible to integrate additional ambient lighting areas and it creates an area above the module to project illuminations (e.g., logo projection). The floating design allows for the extension of the panoramic glass roof and the module may be used in convertibles.

The reflective element and mirror casing are adjustable relative to a base portion or mounting assembly or mounting structure attached to the overhead console module to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

Optionally, the mirror casing may include a bezel portion that circumscribes a perimeter region of the front surface of the reflective element, or the perimeter region of the front surface of the reflective element may be exposed (such as by utilizing aspects of the mirror reflective elements described in U.S. Pat. Nos. 8,508,831 and/or 8,730,553, and/or U.S. Publication Nos. US-2014-0022390; US-2014-0293169 and/or US-2015-0097955, which are hereby incorporated herein by reference in their entireties).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910, 854; 5,142,407 and/or 4,712,879, which are hereby incorporated herein by reference in their entireties.

The mirror assembly or overhead console module may include user actuatable inputs operable to control any of the accessories of or associated with the mirror assembly and/or overhead console module. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or U.S. Publication Nos. US-2014-0022390 and/or US-2014-0293169, which are hereby incorporated herein by reference in their entireties, or such as proximity sensors of the types described in U.S. Pat. Nos. 7,224,324; 7,249,860 and/or 7,446,924, and/or U.S. Publication No. US-2006-0050018, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736; and/or US-2010-0097469, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor (such as a CMOS imaging array sensor having at least one million photosensors arranged in rows and columns), a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, and/or International Publication Nos. WO 2009/046268 and/or WO 2009/036176, which are all hereby incorporated herein by reference in their entireties, or from one or more imaging systems of the vehicle, such as a reverse or backup aid system, such as a rearward directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EYEQ™ image processing chip available from Mobileye Vision Technologies Ltd. of Jerusalem, Israel, and such as an image processor of the types described in U.S. Pat. No. 9,126,525, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

The vehicular accessory system may include a camera or sensor or light of a driver monitoring system and/or head and face direction and position tracking system and/or eye tracking system and/or gesture recognition system. Such cameras and/or near-IR illuminators and/or head and face direction and/or position tracking systems and/or eye tracking systems and/or gesture recognition systems may utilize aspects of the systems described in U.S. Pat. Nos. 11,518,401; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0202151; US-2020-0143560; US-2019-0210615; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or US-2014-0336876, and/or International PCT Application No. PCT/US2022/075887, filed Sep. 2, 2022, and/or International Publication Nos. WO 2022/241423 and/or WO 2022/187805, which are all hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Publication Nos. US-2021-0245662; US-2021-0162926; US-2021-0155167; US-2018-0134217 and/or US-2014-0285666, and/or International Publication No. WO 2022/150826, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 11,242,008; 10,442,360 and/or 10,046,706, and/or U.S. Publication Nos. US-2021-0162926; US-2021-0155167 and/or US-2019-0118717, and/or International Publication No. WO 2022/150826, which are all hereby incorporated herein by reference in their entireties.

The mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, which are all hereby incorporated herein by reference in their entireties.

Optionally, the vehicular accessory system (such as at the mounting portion of the overhead console module, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281 which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular accessory system, the vehicular accessory system comprising:
   an overhead console module, wherein the overhead console module comprises (i) a primary portion configured to attach at an interior portion of a vehicle equipped with the vehicular accessory system to mount the overhead console module at the interior portion of the vehicle and (ii) a secondary portion that, with the primary portion attached at the interior portion of the vehicle, extends from the primary portion;
   wherein the secondary portion of the overhead console module, with the primary portion of the overhead console module attached at the interior portion of the vehicle, extends along an interior surface of the vehicle and is below and is spaced from the interior surface of the vehicle;
   an interior rearview mirror assembly comprising a mirror head and mounting structure, wherein the mirror head is adjustably mounted at the mounting structure, and wherein the mounting structure is attached at the overhead console module;
   wherein the mirror head comprises a variably reflectance electro-optic mirror reflective element and at least one electronic accessory;
   an electronic control unit (ECU) disposed at the overhead console module, wherein the ECU comprises electronic circuitry and associated software; and
   wherein the ECU, with the primary portion of the overhead console module attached at the interior portion of the vehicle, is operable to (i) control a system of the vehicle, (ii) control the at least one electronic accessory of the mirror head of the interior rearview mirror assembly and (iii) control dimming of the variably reflectance electro-optic mirror reflective element.

2. The vehicular accessory system of claim 1, wherein a light source is disposed at the secondary portion of the overhead console module, and wherein the light source, when electrically operated and with the primary portion of the overhead console module attached at the interior portion of the vehicle, emits light upward from the secondary portion of the overhead console module and toward the interior surface of the vehicle, and wherein the emitted light illuminates a portion of the interior surface of the vehicle.

3. The vehicular accessory system of claim 2, wherein the light source illuminates the portion of the interior surface of the vehicle to provide illumination within an interior cabin of the vehicle.

4. The vehicular accessory system of claim 2, wherein the ECU is operable to control the light source to adjust the light emitted by the light source.

5. The vehicular accessory system of claim 4, wherein the ECU controls the light source to adjust at least one of (i) brightness of the light emitted by the light source and (ii) a color of the light emitted by the light source.

6. The vehicular accessory system of claim 4, wherein the ECU controls the light source to adjust illumination of the portion of the interior surface of the vehicle.

7. The vehicular accessory system of claim 6, wherein the ECU is operable to adjust the light source between (i) illuminating a central portion of the interior surface of the vehicle and (ii) illuminating a peripheral portion of the interior surface of the vehicle.

8. The vehicular accessory system of claim 2, wherein the light source illuminates an icon at the interior surface of the vehicle.

9. The vehicular accessory system of claim 1, wherein the variably reflectance electro-optic mirror reflective element comprises an electrochromic mirror reflective element.

10. The vehicular accessory system of claim 1, wherein the at least one electronic accessory of the mirror head comprises a driver monitoring camera disposed behind the variably reflectance electro-optic mirror reflective element and viewing through the variably reflectance electro-optic mirror reflective element for determining attentiveness of a driver of the vehicle.

11. The vehicular accessory system of claim 10, wherein the at least one electronic accessory of the mirror head further comprises a light emitter disposed behind the variably reflectance electro-optic mirror reflective element and emitting light that passes through the variably reflectance electro-optic mirror reflective element for illuminating the driver of the vehicle.

12. The vehicular accessory system of claim 1, wherein the primary portion of the overhead console module, when attached at the interior portion of the vehicle, is attached at an upper region of a windshield of the vehicle.

13. The vehicular accessory system of claim 12, wherein the vehicle comprises a sunroof, and wherein the secondary portion of the overhead console module, with the primary portion of the overhead console module attached at the interior portion of the vehicle, extends along the sunroof and is below and is spaced from the sunroof.

14. The vehicular accessory system of claim 12, wherein the vehicle comprises a retractable roof, and wherein the secondary portion of the overhead console module, with the primary portion of the overhead console module attached at the interior portion of the vehicle, and with the retractable roof in a non-retracted state, extends along an interior surface of the retractable roof and is below and is spaced from the interior surface of the retractable roof.

15. The vehicular accessory system of claim 1, further comprising a sensor that, with the primary portion of the overhead console module attached at the interior portion of the vehicle, captures sensor data, and wherein the ECU includes a data processor operable to process sensor data captured by the sensor.

16. The vehicular accessory system of claim 15, wherein the sensor is disposed at the overhead console module, and wherein the sensor comprises an imaging sensor that, with the primary portion of the overhead console module attached at the interior portion of the vehicle, views forward of the vehicle through a windshield of the vehicle.

17. The vehicular accessory system of claim 15, wherein the ECU controls dimming of the variably reflectance electro-optic mirror reflective element responsive to processing of captured sensor data.

18. The vehicular accessory system of claim 1, wherein the ECU includes an image processor operable to process image data captured by one or more cameras disposed at the vehicle, and wherein the at least one electronic accessory of the mirror head comprises a video display screen, and wherein the video display screen, with the primary portion of the overhead console module attached at the interior portion of the vehicle, displays video images derived from image data processed at the ECU.

19. The vehicular accessory system of claim 1, wherein the overhead console module comprises a user actuatable input, and wherein the ECU, responsive to a user input at the user actuatable input, controls the system of the vehicle.

20. The vehicular accessory system of claim 1, wherein the system of the vehicle comprises an advanced driver assist system (ADAS) of the vehicle, and wherein the ECU is operable to provide an input to the ADAS to at least partially control the vehicle during a driving maneuver of the vehicle.

21. The vehicular accessory system of claim 1, wherein the system of the vehicle comprises a vision system of the vehicle, and wherein the ECU is operable to provide an input to the vision system to control display of video images at a display screen of the vehicle, the video images derived from image data captured by one or more cameras of the vehicle.

22. The vehicular accessory system of claim 1, wherein the system of the vehicle comprises a telecommunications system of the vehicle, and wherein the ECU is operable to control the telecommunications system to perform a call function of the telecommunications system.

23. A vehicular accessory system, the vehicular accessory system comprising:

an overhead console module, wherein the overhead console module comprises (i) a primary portion configured to attach at an interior portion of a vehicle equipped with the vehicular accessory system to mount the overhead console module at the interior portion of the vehicle and (ii) a secondary portion that, with the primary portion attached at the interior portion of the vehicle, extends from the primary portion;

wherein the secondary portion of the overhead console module, with the primary portion of the overhead console module attached at the interior portion of the vehicle, extends along an interior surface of the vehicle and is below and is spaced from the interior surface of the vehicle;

an interior rearview mirror assembly comprising a mirror head and mounting structure, wherein the mirror head is adjustably mounted at the mounting structure, and wherein the mounting structure is attached at the overhead console module;

wherein the mirror head comprises a variably reflectance electro-optic mirror reflective element and at least one electronic accessory;

wherein a light source is disposed at the secondary portion of the overhead console module, and wherein the light source, when electrically operated and with the primary portion of the overhead console module attached at the interior portion of the vehicle, emits light upward from the secondary portion of the overhead console module and toward the interior surface of the vehicle, and wherein the emitted light illuminates a portion of the interior surface of the vehicle;

an electronic control unit (ECU) disposed at the overhead console module, wherein the ECU comprises electronic circuitry and associated software;

wherein the ECU, with the primary portion of the overhead console module attached at the interior portion of the vehicle, is operable to (i) control the light source to adjust the light emitted by the light source, (ii) control the at least one electronic accessory of the mirror head of the interior rearview mirror assembly and (iii) control dimming of the variably reflectance electro-optic mirror reflective element; and wherein the overhead console module comprises a user actuatable input, and wherein the ECU, responsive to a user input at the user actuatable input, controls the light source to adjust the light emitted by the light source.

24. The vehicular accessory system of claim 23, wherein the ECU controls the light source to adjust at least one of (i) brightness of the light emitted by the light source and (ii) a color of the light emitted by the light source.

25. The vehicular accessory system of claim 23, wherein the ECU controls the light source to adjust illumination of the portion of the interior surface of the vehicle, and wherein the ECU is operable to adjust the light source between (i) illuminating a central portion of the interior surface of the vehicle and (ii) illuminating a peripheral portion of the interior surface of the vehicle.

26. The vehicular accessory system of claim 23, wherein the at least one electronic accessory of the mirror head comprises (i) a driver monitoring camera disposed behind the variably reflectance electro-optic mirror reflective element and viewing through the variably reflectance electro-optic mirror reflective element for determining attentiveness of a driver of the vehicle and (ii) a light emitter disposed behind the variably reflectance electro-optic mirror reflective element and emitting light that passes through the variably reflectance electro-optic mirror reflective element for illuminating the driver of the vehicle.

27. A vehicular accessory system, the vehicular accessory system comprising:

an overhead console module, wherein the overhead console module comprises (i) a primary portion configured to attach at an interior portion of a vehicle equipped with the vehicular accessory system to mount the overhead console module at the interior portion of the vehicle and (ii) a secondary portion that, with the primary portion attached at the interior portion of the vehicle, extends from the primary portion;

wherein the secondary portion of the overhead console module, with the primary portion of the overhead console module attached at the interior portion of the vehicle, extends along an interior surface of the vehicle and is below and is spaced from the interior surface of the vehicle;

wherein the primary portion of the overhead console module, when attached at the interior portion of the vehicle, is attached at an upper region of a windshield of the vehicle;

an interior rearview mirror assembly comprising a mirror head and mounting structure, wherein the mirror head is adjustably mounted at the mounting structure, and wherein the mounting structure is attached at the overhead console module;

wherein the mirror head comprises a variably reflectance electro-optic mirror reflective element and at least one electronic accessory;

an electronic control unit (ECU) disposed at the overhead console module, wherein the ECU comprises electronic circuitry and associated software;

wherein the ECU includes an image processor operable to process image data captured by one or more cameras disposed at the vehicle;

wherein the at least one electronic accessory of the mirror head comprises a video display screen, and wherein the video display screen, with the primary portion of the overhead console module attached at the interior portion of the vehicle, displays video images derived from image data processed at the ECU; and wherein the ECU, with the primary portion of the overhead console module attached at the interior portion of the vehicle, is operable to (i) control a system of the vehicle, (ii) control the display of video images at the video display screen of the mirror head and (iii) control dimming of the variably reflectance electro-optic mirror reflective element.

28. The vehicular accessory system of claim 27, wherein a light source is disposed at the secondary portion of the overhead console module, and wherein the light source, when electrically operated and with the primary portion of the overhead console module attached at the interior portion of the vehicle, emits light upward from the secondary portion of the overhead console module and toward the interior surface of the vehicle, and wherein the emitted light illuminates a portion of the interior surface of the vehicle.

29. The vehicular accessory system of claim 28, wherein the ECU is operable to control the light source to adjust the light emitted by the light source.

30. The vehicular accessory system of claim 27, wherein the system of the vehicle comprises an advanced driver assist system (ADAS) of the vehicle, and wherein the ECU is operable to provide an input to the ADAS to at least partially control the vehicle during a driving maneuver of the vehicle.

* * * * *